United States Patent [19]

McMillan

[11] Patent Number: 5,844,008
[45] Date of Patent: Dec. 1, 1998

[54] PROCESS FOR TREATING MUNICIPAL SOLID WASTE

[75] Inventor: Mark A. McMillan, Kula, Hi.

[73] Assignee: Environmental Technology Associates, Kula, Hi.

[21] Appl. No.: 872,622

[22] Filed: Jun. 10, 1997

[51] Int. Cl.[6] ..................................................... C08J 9/08
[52] U.S. Cl. ........................... 521/99; 521/128; 521/155; 521/170; 588/6; 588/255
[58] Field of Search ................................ 521/40, 40.5, 49, 521/99, 128, 155, 170; 588/6, 255

[56] References Cited

U.S. PATENT DOCUMENTS

| | | |
|---|---|---|
| 4,227,653 | 10/1980 | Jetzer . |
| 4,426,042 | 1/1984 | Hively . |
| 4,540,467 | 9/1985 | Grube et al. . |
| 4,550,495 | 9/1985 | Holloway . |
| 4,934,285 | 6/1990 | Jormanainen et al. . |
| 5,190,226 | 3/1993 | Holloway . |
| 5,265,979 | 11/1993 | Hansen . |
| 5,352,710 | 10/1994 | Lauri . |
| 5,361,994 | 11/1994 | Holloway . |
| 5,630,785 | 5/1997 | Pridemore et al. . |

*Primary Examiner*—John M. Cooney, Jr.
*Attorney, Agent, or Firm*—Hayes, Soloway, Hennessey, Grossman & Hage, P.C.

[57] ABSTRACT

A foamed solid product characterized in that said product is produced and prepared by a continuos process comprising mixing water permeated municipal solid waste (MSW) with a solidification reagent, wherein said solidification reagent initiates a polymerization reaction with the waste and the polymerization reaction forms a rigid polymer matrix therein. In addition, the polymer matrix also expands in volume during the polymerization reaction to form a foamed, environmentally stable, recycled solid product.

14 Claims, 1 Drawing Sheet

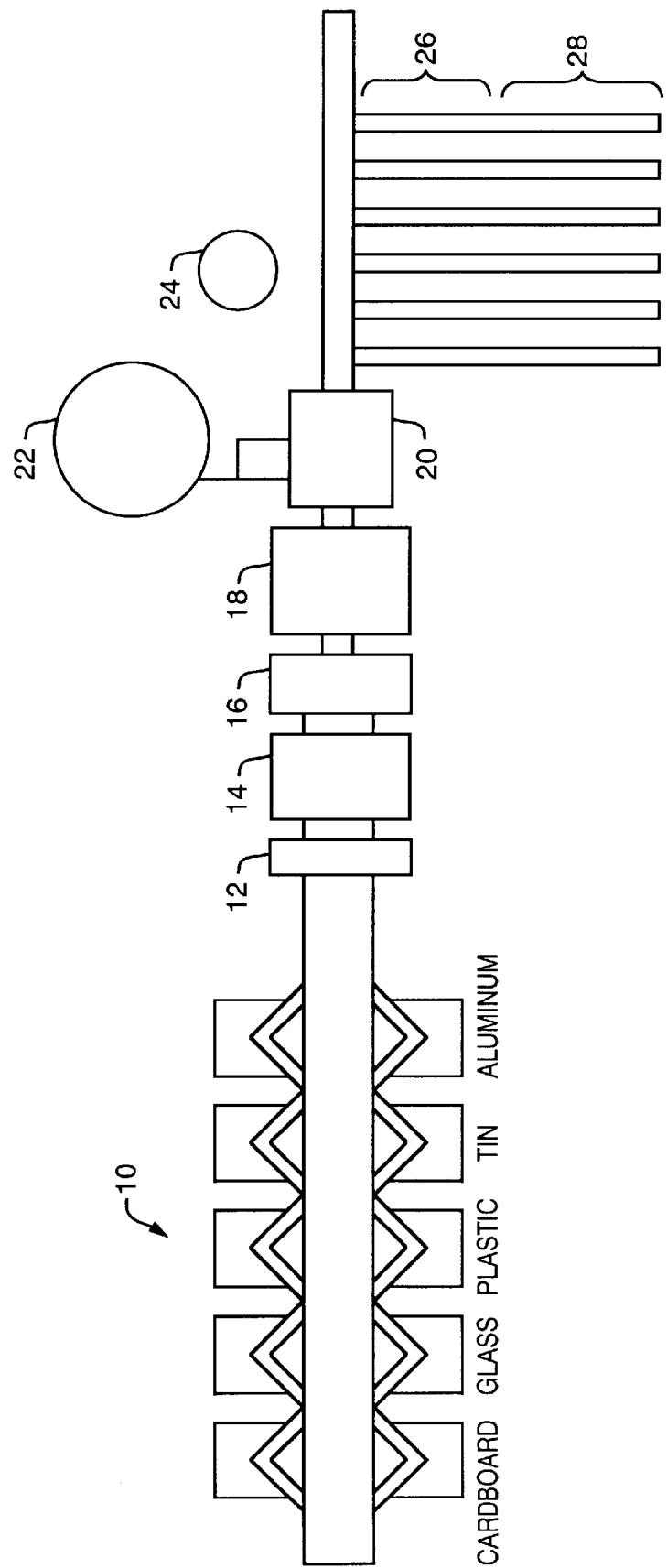

PROCESS FOR TREATING MUNICIPAL SOLID WASTE

FIELD OF THE INVENTION

This invention relates to a method and apparatus, as well as a product produced, in connection with the recovery and continuous formation of a stable, non-hazardous material, from municipal solid waste (MSW).

BACKGROUND OF THE INVENTION

It is an understatement to note that at the present time, one of the major problems confronting our society is the generation of waste. One solution to solid waste disposal has been to place to solid waste (including MSW) into landfills. The most commonly considered alternatives to landfill are mass incineration and its related activity, the production of refuse derived fuel (RDF). Incineration and RDF produce a variety of pollutants, caused in part by incomplete combustion and the combustion of waste products that yield toxic by-products.

Recycling, of course, has been a popular approach, and towards such objective numerous efforts have been made to recycle waste products into commercially useful products. Environmentalists and public officials view recycling of waste materials as the most desirable method of waste disposal. However, the fact remains that present recycling efforts have reduced the volume of MSW by less than ten percent.

Another solution to waste generation would be the formulation of degradable materials. For example, many of the major producers of plastic materials have produced polymers that are particularly sensitive to the action of light, and so-called light-degradable plastics have been commercialized. For example, copolymers of polyethylene with about 1.0% carbon monoxide have been prepared and employed as an environmentally degradable six-pack beverage ring. Biodegradable polymers based on cornstarch, cellulose, lactic acid and proteins are all under development. So once again, at the present time, the biodegradation approach has had limited effect given the enormous volume of waste materials produced.

Not surprisingly, therefore, the patent literature has been replete with various reports concerning MSW management, offering all sorts of proposal to deal with this exploding problem. For example, in U.S. Pat. No. 4,426,042, entitled "Method of Shredding Solid Waste", an improved method of shredding MSW or garbage is disclosed, which maintains the moisture content of the waste, and the shredded waste is then said to be available for efficient disposal or further processing.

In U.S. Pat. No. 4,934,285, entitled "Method for Treating Waste Materials", there is described a method for treating waste materials, which divides the waste material into a compost fraction and a refuse-derived fuel fraction, wherein the compost fraction is exposed to a biological treatment of its own to produce a gaseous fuel. The refuse-derived fuel is burned at high temperature, and the exhaust gases are routed into an after-burning chamber, along with the gaseous fuel from the biologically decomposed compost.

In U.S. Pat. No. 4,227,653, entitled "Method of Processing Waste Materials", moist municipal waste is subjected to a preliminary comminuting action to reduce particle size, and the larger heavy particles are segregated from lighter particles which include relatively small fibrous particles and relatively large additional lighter particles. The additional lighter particles are then segregated from the relatively small fibrous particles and subjected to a severing action to reduce their size to a size not exceeding that of the lighter fibrous particles. The fibrous particles are then mixed with the severed additional particles, and the mixture is dried and ozonized, and portions thereof are used for the manufacture of shaped articles.

In U.S. Pat. No. 4,540,467 entitled "Method of Fragmenting Municipal Solid Waste", a method and apparatus is disclosed for the removal of mold core material from metal castings and for fragmentation of municipal waste materials, e.g., paper products. The method involves heating and hydrating the materials within a pressure vessel.

In U.S. Pat. No. 4,540,495 entitled "Process for Treating Municipal Solid Waste", a process for treating MSW material in the presence of moisture is disclosed, aimed at the recovery and separation of inorganic and organic matter.

In U.S. Pat. No. 5,190,226 entitled "Apparatus and Method for Separation, Recovery and Recycling Municipal Solid Waste And The Like", there is disclosed an apparatus and method for separation and recovery of MSW, via the introduction of solid waste material into a rotatable pressure vessel, which rotates, pressurizes and heats the waste material while simultaneously applying an extruding action. The extruding action is achieved by a rotatable extruder mechanism in the pressure vessel which forces the processed solid waste material through a constricted area adjacent the exit of the pressure vessel.

In U.S. Pat. No. 5,265,979 entitled "High Efficiency Waste Placement System for Municipal Landfills", the solid waste is placed in a preselected geometric form to form a waste pile, followed by coating of the exposed portion of the pile with a synthetic cover compound comprising a liquid, binder, cellulose fibers, and plastic fibers, followed by what is termed "biostabilizing" the pile, and compaction.

In U.S. Pat. No. 5,352,710 entitled "Neither Toxic Nor Environmentally Noxious Foamed-Polymer Products", a cellular or foamed-polymer product is disclosed formed by the combination of a variety of polymer foam-forming compounds. The cellular or foamed polymer products are then said to be safe with regards to health and environment, and therefore disposable as waste similar to municipal solid waste.

Finally, in U.S. Pat. No. 5,361,994 entitled "Apparatus and Method for Preparation and Separation, Recovery And Recycling of Municipal Solid Waste And The Like", there is disclosed an a vessel for subjecting the waste material to heat and pressure while simultaneously applying an extruding action to the solid waste. The extruding action is achieved by a rotatable extruder mechanism carried out in the pressure vessel and rotated in response to the rotating section thereof.

As can be seen upon the above review of the prior art, numerous efforts have been explored to improve upon the processing of MSW, with the objective of producing a product that is either densified, converted into a fibrous or particulate form, so that it can be better separated from a commingled waste stream, and can be made to take up less room in a landfill, or can be subjected to combustion with a more efficient energy output. However, as is also clear from the above review of the prior art, there are limited reports and emphasis on the fact that MSW itself could somehow serve as a direct substrate for the production of a molded products, if somehow it could be carefully and chemical modified into a non-toxic and useful solid feed resin-type material.

Accordingly, it is an object of this invention to develop a modified MSW material that can be combined with selected chemical solidification agents, which convert the MSW into an environmentally stable product, which conversion process can be made continuous, and which process allows for high and efficient output, and which product is environmentally safe and useful for the manufacture of various industrial or consumer type products.

In addition, it is also an object of this invention to develop the associated processes and apparatus necessary for the production of said stable MSW material product, which apparatus and process thereby assists in solving the principal and long-standing problem of landfill overcrowding.

SUMMARY OF THE INVENTION

A continuous process for reacting and converting municipal solid waste into a polymer filled product comprising the steps of reducing the particle size of said solid waste into a size that permits said particles to be permeated with water, substantially permeating said reduced size particles with water, followed by mixing and chemically reacting said water permeated particles with a solidification reagent. The solidification reagent initiates a chemical polymerization reaction within said water permeated particles and solidifies said water permeated particles along with an associated increase in volume.

In product form, the present invention comprises a foamed solid product characterized in that said product is continuously produced and prepared by the process comprising mixing water permeated municipal solid waste with a solidification reagent, wherein said solidification reagent initiates a polymerization reaction with said waste and said polymerization reaction forms a rigid and expanded polymer matrix within said MSW material.

BRIEF DESCRIPTION OF THE DRAWINGS

FIG. 1 illustrates a schematic diagram of the method of the present invention.

DESCRIPTION OF THE PREFERRED EMBODIMENTS

As noted above, the present invention relates to both a continuous process and product formed which alleviates the problem landfill overcrowding. In broad aspect, the present invention discloses a new method and product based upon the continuous conversion of MSW into an expanded or foamed solid polymeric product, that is environmentally safe, and which can be used for a number of recycling applications.

With reference to FIG. 1, which illustrates in schematic format the preferred continuous process herein, through the normal collection process of MSW, the waste 10 is normally delivered to and dumped by transport vehicles onto a sorter assembly. The MSW, as illustrated, comprises a mixture of cardboard, glass, plastic, tin and aluminum, and other miscellaneous waste stream components. The MSW is then conveyed first through an electromagnetic separator, 12, a primary shredder 14, a finish shredder 16 and into a silo 18. It is the role of the electromagnetic separator 12 to eliminate the possibility of large metal pieces from entering the primary shredder 14. Accordingly, the large metal pieces removed at this point can be conveniently transferred to a separate recycling facility.

The primary shredder 14 preferably reduces the MSW initially to a particle size of about 3.0 inches. This 3.0 inch particle size is then augured to finish shredder 16 which preferably reduces the particle size further to about 0.375 inches. This reduced size MSW is then augured to a panelized silo for volume storage.

In connection with the above referenced particle size reduction, it is to be noted that the purpose of the particle size reduction is to reduce the MSW into a form that would allow, as herein disclosed, permeation with water. In other words, the objective is to substantially and homogeneously permeate the MSW with water, as water preferably serves as the source for provoking a uniform and homogenous chemical polymerization reaction, which is made possible by treatment with what is termed herein as the solidification reagent. The solidification reagent therefore converts the water permeated MSW into substantially solid and somewhat expanded form, which solid matrix product is an environmentally stable product.

Without being bound by any particular theory, it is believed that the environmentally stable features of the product herein can be attributed in part to the fact that the solidification reagent, by provoking a chemical polymerization within the MSW, operates to encapsulate any of the more fluid and toxic components therein. In other words, should the MSW contain certain low molecular weight but otherwise toxic materials, which would normally leach from the MSW over time, the solidification process prevents such from occurring, and represents one of the several important benefits of the present invention. In addition, it is believed that shredder heat and the overall weight dilution with solidification reagent also serve to reduce or detoxify the MSW material.

At 22 is illustrated a mixer, which is preferably a counter rotating shaft continuous blender with adjustable retention time and agitation, supplied with a water feed 22. Accordingly, as noted above, water is combined with the MSW at this point in the continuous process, and preferably it has been found that for a given volume of MSW, about 10–40% volume equivalent of water is combined therewith, and the MSW is then substantially permeated with water in the mixer 22.

As shown in FIG. 1, the solidification reagents 24 are conveniently stored proximate to the continuous processing line. The solidification reagents are then conveniently added and preferably added to the water permeated MSW via, e.g., incorporation into extruders shown generally at 26, which are followed by die molds 28, which molds also conveniently shape the expanded and solidified product herein produced. However, within the general scope of the present invention, the addition of the solidification reagent can also take place on, e.g., an injection molding machine, or any other molding apparatus which would allow for relatively convenient continuous mixing and continuous production of a recycled molded part.

In connection with the continuous process disclosed herein, and as noted, upon combination of the water permeated MSW with the solidification reagent, a polymerization reaction is initiated, which polymerization reaction preferably leads to the development of polyurethane type structure. Accordingly, those skilled in the art will recognize that the preferred solidification reagent contains isocyanate functionality, e.g., 2,4-toluene diisocyanate, 2,6-toluene diisocyanate, 4,4-diphenylmethane-diisocyanate (MDI) and mixtures thereof. In addition, there are a number of liquid type isocyanate reagents on the market, typical of which are the polymeric diisocyanates, or "PMDI". Accordingly, such liquid PMDI's would also be suitable as a candidate solidification reagent in accordance with the present invention.

In broad aspect, however, any chemical reagent that would act in what can be described as a monomeric capacity, which upon exposure to the water permeated MSW would react and solidify, would be suitable in accordance with the present invention. Towards such broad selection criterion, those chemical compounds that would polymerize in the presence of moisture would be particularly suited, as well as any monomers which rapidly polymerize to high molecular weight polymer, without the formation of toxic by-products. In addition, the preferred solidification reagents will also give rise to an expansion in volume, and such expansion in volume has been found to preferably fall in the range of less than 20%. However, while a 20% or less expansion in volume has been found preferred, as such levels of expansion provide a more managable material for downstream molding, other levels of expansion in volume would be acceptable. That being the case, expansion in volumes can be relative large, should one desire to produce a foamed MSW, wherein such foam can have a density between 1–20 lbs/ft$^3$.

In a particularly preferred embodiment, the solidification reagent is an expanding polyurethane system, and includes a product sold by Sika, Inc., under the tradename "SIKA-FIX". Again, without being bound by any theory, upon mixing of the SIKAFIX with the water saturated MSW, an expansion in volume occurs. Apparently, the free isocyanate functionality present in the SIKAFIX reacts with the water present in the MSW, thereby producing carbon dioxide blowing agent. Since there is also an associated exothermic reaction occurring (polyurethane polymerization), the carbon dioxide escapes, and as noted, the MSW responds with a volume increase of about 20%.

The solidified and expanded MSW of the present invention can also be conveniently routed, as previously noted, through any number of extrusion die/molds, so that the product is converted into some desired final shape. In other words, the die/molds shown generally at 28 can assume endless design options for useful production of low-cost recycled consumer or industrial products.

In addition to the above, it is worth noting that in accordance with the invention herein, which produces an environmentally safe product, and which invention alleviates landfill overcrowding, the invention herein provides a continuous process for producing solidified MSW and in so doing, accomplishes its objective via a nearly zero emissions result from the primary shredder 12 through the die molds 28. This, of course, emphasizes yet another advantage of the present invention over prior art combustion techniques reviewed earlier that produce undesirable side products of both gaseous and particulate nature.

Finally, in a particularly preferred embodiment, the unsorted MSW (9 lb. @ 1 cf) bulk density is conveyed at 10 feet per minute on a 3 foot wide belt conveyor to a primary shredder (Hammermill) at 600–800 rpm with a 3 inch screen. The MSW is then augured at 20 rpm to a finish shredder (Bouldin/Lawson or equivalent) at 600 rpm with a ⅜ inch screen, followed by augering at 30 rpm and then to a panelized silo for volume storage.

The MSW is then auguered to a Scott Model 7214 duplex pugmill continuous mixer with a counter rotating shaft with a retention time of about 45 seconds and about 10–40% moisture (water) is force fed to a high pressure screw extruder (single or twin screw) and at this point the solidification reagent (preferably SIKAFIX expanding polyurethane grout) is injected via a vent port of the extruder (vent port 1) at 2–6% (wt) concentration. This is followed by a 3–30 sec reaction time for expansion, and moisture which accumulates is vented through a downstream extruder vent port. The product then is stabilized and with pressure of about 3000–10,000 psi generated in the extruder, the product is conveyed to the die mold for final formation into the environmentally stable and recycled MSW of the present invention.

Those skilled in the art will therefore recognize the utility of this invention in producing in a continuous manner MSW in a recycled form that is environmentally more acceptable and avoids the various partial attempts to selectively recycle fractions of the MSW waste stream in a non-continuous and far more expensive manner.

I claim:

1. A continuous method for reacting and converting municipal solid waste into a polymer filled product comprising the steps of supplying municipal solid waste and physically removing metals from said solid waste followed by reducing the particle size of said solid waste into a size that permits said particles to be permeated with water, substantially permeating said reduced size particles with water to a level of about 10–40% (vol), followed by continuous mixing and chemically reacting said water permeated particles with a solidification reagent in an extruder or injection molding machine which solidification reagent initiates a chemical polymerization reaction with said water in said water saturated particles and solidifies said water permeated particles along with a corresponding increase in volume of about 20% or less.

2. The method of claim 1, wherein the particle size that permits said particles to become substantially permeated with water is about 0.375 inches.

3. The method of claim 1, wherein said solidification reagent is a chemical compound comprising one or more isocyanate functional groups.

4. The method of claim 3, wherein said isocyanate functional compound is selected from the group consisting of 2,4-toluene-diisocyanate, 2,6-toluene isocyanate, 4,4-diphenylmethane-diisocyanate, polymethylene diisocyanate (PMDI), and mixtures thereof.

5. The method of claim 1, wherein said solidification reagent forms a solid or rigid polyurethane foam.

6. The method of claim 1 wherein said solidification reagent is selected from a monomeric chemical compound which polymerizes in the presence of moisture.

7. A foamed solid product characterized in that said product is produced and prepared by a continuous molding process comprising supplying municipal solid waste and physically removing metals therefrom, followed by continuous mixing said municipal solid waste with water to a level of about 10–40% (vol) and a solidification reagent in an extruder or injection molding apparatus, wherein said solidification reagent initiates a polymerization reaction with said water in said waste and said polymerization reaction forms a rigid polymer matrix within said waste, which matrix also expands about 20% or less in volume during said polymerization to form said foamed solid product.

8. The foamed solid product of claim 7, wherein said polymerization reaction is a polyurethane polymerization reaction, and said expansion in volume is about 20%.

9. The foamed solid product of claim 7, wherein said solidification reagent is a chemical compound comprising one or more isocyanate functionalities.

10. The foamed solid product of claim 9, wherein said isocyanate functional compound is selected from the group consisting of 2,4-toluene-diisocyanate, 2,6-toluene isocyanate, 4,4-diphenylmethane-diisocyanate, polymethylene diisocyanate (PMDI), and mixtures thereof.

11. A continuous method for reacting and converting municipal solid waste into a solid polymer-filled product comprising the steps of
   (a) substantially removing metal from said waste by physically removing said metal from said waste
   (b) placing the product in step (a) into a shredder which reduces the particle size so that said particles can be substantially permeated with water to a level of about 10–40% (vol)
   (c) substantially permeating the product of step (b) with water to a level of about 10–40% (vol)
   (d) continuously mixing and chemically reacting the product of step (c) with a solidification reagent in an extruder or injection molding machine, which chemical reaction results in polymerization and solidification along with an increase in volume of about 20% or less.

12. The process of claim 11, wherein step (a) is achieved by exposing said solid waste to an electromagnetic metal separator.

13. The process of claim 11, wherein the step (b) shredding provides a particle size of about 0.375 inches.

14. The process of claim 11 wherein the solidification reagents is present at a concentration of about 4–10% (wt).

* * * * *